March 12, 1957     E. L. FIX     2,784,462

SEALING MEANS FOR GLAZING UNIT

Filed Jan. 22, 1954

INVENTOR.
EARL L. FIX
BY
Oscar L. Spencer
ATTORNEY

United States Patent Office 2,784,462
Patented Mar. 12, 1957

2,784,462
SEALING MEANS FOR GLAZING UNIT

Earl L. Fix, New Kensington, Pa., assignor to Pittsburgh Plate Glass Company, Allegheny County, Pa., a corporation of Pennsylvania Application January 22, 1954, Serial No. 405,646

7 Claims. (Cl. 20—56.5)

This invention relates to an improvement in multiple glazed units that comprise at least two spaced panes of glass that are united about their peripheries by a peripheral strip. In particular, this invention relates to improved seals to be used in conjunction with such assemblies.

Conventionally, units of the type described above are fabricated by holding two sheets of glass slightly apart and heating the peripheral portion of the glass panes until they fuse. This fusing is usually accomplished by passing an electric current through a thin film of graphite placed around the periphery of the glass in order to impart sufficient heat to the glass to heat it to fusing temperature. The graphite is oxidized at the high temperature produced and the glass periphery itself becomes electrically conductive while the glass is being fused. Before the glass is allowed to cool, the two sheets are further separated by means such as suction. A typical method of forming such an assembly, known commonly as an all glass unit, is described in U. S. Patent No. 2,624,978 issued to Frederick R. Hohmann.

It is necessary that the assembly be allowed to breathe during fabrication and for this purpose, a small hole, known as a pore hole, is drilled adjacent the corner of one of the glass panes comprising the assembly. This provision for breathing is made in order to prevent failure of the unit due to a large pressure differential that would otherwise be established between the outside atmosphere and the air contained within the assembly when the individual glass panes are separated during fabrication of the unit.

The most difficult problem to overcome in the development of all glass units has been the provision of a suitable seal to close the pore hole required during fabrication of the assembly. In order for a seal closing the pore hole to be acceptable, it must provide a closing that is both water and air tight and inhibit the passage of dust and dirt into the space enclosed. The reason for a water impervious seal is obvious. The presence of water vapor in the window assembly causes fogging of the inner surface of the sheet exposed to a temperature below the dew point of the air within the assembly. This reduces the transparency of the assembly. Therefore, it is necessary that before the pore hole is sealed that dry air be inserted within the air chamber enclosed by the assembly.

Since glass is able to withstand considerable compressive forces but fractures easily upon the application of tensile stresses, it has been found advisable to force dry air within the assembly under pressure before the pore hole is sealed, thus applying a compressive force to the outer surface of the assembly in the vicinity of its periphery. Thus, when the assembly is subjected to pressure and temperature variations during use, the tendency of the outer surface of the assembly to be placed in tension is compensated by the prestressing of the unit in compression by the introduction of the dry air under pressure at the time the pore hole is sealed. For most operations, a pressure slightly above one atmosphere has been found to be most suitable for providing sufficient stress compensation for the range of temperature and pressure variations to which these units can be expected to be subjected. Thus, a suitable pore hole seal is required to be strong enough to maintain the dry air within the assembly under pressure.

One of the most suitable materials for use in plugging a pore hole seal is the mastic composition described in Patent No. 2,551,952, issued to Gerald E. Kunkle. However, it has been necessary in the past to provide a means for maintaining the mastic plug within the pore hole due to the limited adhesion of the mastic to glass. Pore hole seals typical of the prior art are inefficient in their operation due mainly to the failure in the past to maintain the mastic plug within the poore hole while the assembly is in use.

Accordingly, it is an object of the present invention to provide an improved sealing means for the pore hole of a multiple glazed unit.

Another object of the present invention is to provide improved means for maintaining a mastic sealing plug within the pore hole of an assembly of the type described hereinabove.

Still another object of the present invention is to provide an improved unitary window unit of substantially homogeneous structure enclosing an air space.

These and other objects of the present invention will be described in connection with the accompanying drawings. It will be understood, however, that the invention is not limited to the specific features disclosed herein for illustration purposes only, but includes the scope of the appended claims.

Figure 1:
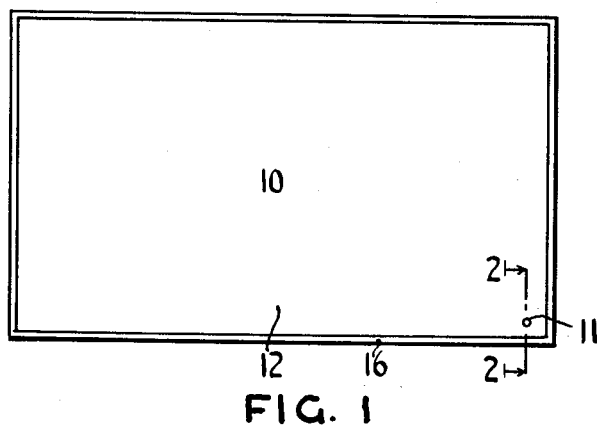
Figure 1 represents a plan view of a multiple pane glass unit provided with a pore hole, the seal for which is the subject matter of the present invention.
Figure 2:
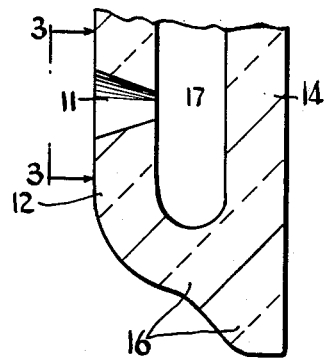
Figure 2 is a cross sectional view of a portion of the unit depicted in Figure 1 along the lines 2—2 of Fig. 1.
Figure 3:
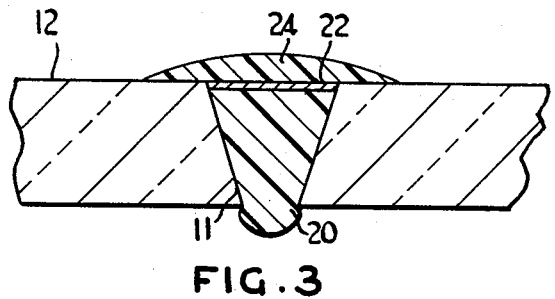
Figure 3 is an enlarged cross sectional view taken along the lines 3—3 of Figure 2 showing the pore hole plugged in a manner taught by the present invention.
Figure 4:
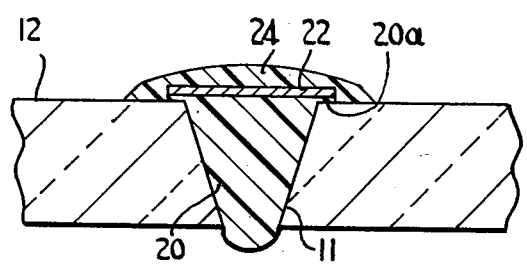
Figure 4 is a view similar to Figure 3 showing an alternate form of the invention.

A typical multiple glazed unit is depicted by reference numeral 10 in Figure 1. This assembly is provided with a pore hole 11 which is required to be sealed and which will be described in greater detail below. Glass panes 12 and 14 (Fig. 2) connected around their periphery by a peripheral glass portion 16 enclose a space 17 within the assembly. The pore hole 11 is shown in Figure 2 as a substantially completely tapered aperture. It will be understood that any aperture that is wider on the outer surface than the surface adjacent the chamber 17 is suitable for the purposes of the present invention. The smallest diameter of the pore hole should not be appreciably less than .100 inch in order to allow sufficient exchange of air between the space 17 and the atmosphere during fabrication of the unit.

Within the tapered aperture is inserted a plug 20 of a mastic material that is impervious to water and air. Such a material is a polyisobutylene composition disclosed in the aforementioned Kunkle patent and having a molecular weight in the range of 10,000. In order to provide suitable flow characteristics to this plug, the polyisobutylene is modified by the uniform dispersal therein of from 30 to 50% by weight of carbon black having an average particle size of from 45 to 55 millimicrons and a surface area of from 5.5 to 7 acres per pound of the dispersed mixture. This modified composition is forced into the tapered aperture and compressed therein. The widened outer portion of the opening facilitates the entry of the mastic material within the opening.

closed herein but is to be accorded the full scope of the claims so as to embrace any and all equivalent devices.

Having described our invention, what we claim as new and desire to secure by Letters Patent is:

1. A mechanical action for artificial limb joints comprising a relatively stationary member and a ratchet segment rotatably mounted on the member, a lever rotatably mounted on the member with the rotational axis adjacent to the circumference of the ratchet segment, a locking bar on said lever having opposite curved faces positioned generally perpendicular to the radius from the rotational axis of the lever, said segment having a series of spaced generally radially extending bar receiving notches with faces complementary to the respective faces of the bar when in bar receiving position, said rotational axis of the lever being at a point adjacent a line tangent to an arc about the axis of said segment struck through the centers of the faces of said notch.

2. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite faces positioned generally perpendicular to the radius from the rotational axis of the lever and the faces, said segment being subject to a rotative load and having a series of spaced generally radially extending bar receiving notches with faces complementary to the respective faces of the bar when in bar receiving position, said rotational axis of the lever being within an angular distance of a line tangent to an arc about the axis of said segment struck through the centers of the faces of said notch such that the component of the force resulting from application of a rotative load tending to disengage the bar from the notch is less than the frictional force on the respective contacting faces.

3. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces positioned generally perpendicular to the radius from the rotational axis of the lever and the faces, said segment having a series of spaced generally radially extending bar receiving notches with arcuate faces complementary to the respective faces of the bar when at bar receiving position, said rotational axis of the lever being within an angular distance of five degrees inside of a line tangent to an arc about the axis of said segment struck through the centers of the faces of said notch.

4. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces of radius of curvature determined by the distance between the rotational axis of the lever and the respective face, said segment having a series of spaced generally radially extending bar receiving notches with arcuate faces complementary to the respective faces of the bar, said rotational axis of the lever being at a point within an angular distance of 15 degrees on either side of a line tangent to an arc centered at the axis of said segment and through the centers of the faces of a notch in bar engaging position, the faces of said notches having positions wherein said last faces are in engagement substantially throughout their areas with the respective faces of the bar when in bar engaging position.

5. A mechanical action for artificial limb joints comprising a pair of members wherein one member is adapted for attachment to a natural limb, parallel plates on one of the members, the other of said members comprising a tubular sleeve rotatably mounted on said plates providing thereby an articulating joint for said action, a ratchet segment fixed on said sleeve having a series of spaced generally radially extending notches, a lever pivotally mounted at a center of rotation on said one member, a locking bar fixed transversely on the lever, and an alternator connected between the lever and one of said members adapted to releasably hold said bar out of notch engagement position, said bar having opposite notch contacting faces curved in the same general direction and said notches having opposite curved bar engaging faces complementary to and adapted to engage the respective faces of the bar when in bar engaging position.

6. A mechanical action for artificial limb joints comprising a relatively stationary member adapted for attachment to a natural limb, parallel plates on said member and a tubular sleeve rotatably mounted on said plates providing thereby an articulating joint for said action, a ratchet segment fixed on said sleeve having a series of spaced generally radially extending notches, a lever pivotally mounted at a center of rotation on said member, a locking bar fixed transversely on the lever, a spring on said member normally urging said bar toward a notch engagement position, and an alternator connected between said member and the lever adapted to releasably hold said bar out of notch engagement position, said bar having opposite notch contacting faces of arcuate form and of radius determined by the distance between the respective face and said center of rotation of the lever, said notches having opposite bar engaging faces of arcuate form complementary to and adapted to engage the respective faces of the bar when in bar engaging position.

7. A ratchet resistant mechanical action for artificial limb joints comprising a base, a ratchet segment rotatably mounted on the base and a locking bar having a pivotal mounting on said base, said locking bar having opposite segment-engaging faces curved in the same general direction about the axis of said pivotal mounting, said segment having a series of peripheral bar receiving notches with opposite faces respectively complementary to the faces on said bar.

References Cited in the file of this patent

UNITED STATES PATENTS 2,637,042    Threewit _____ May 5, 1953

FOREIGN PATENTS 303,664    Germany _____ Feb. 11, 1918 opening being larger at one end to facilitate the application of a sealing compound within said opening, a mastic material impervious to water and air substantially completely filling said opening, a malleable metal cap superimposed on said mastic material to maintain said mastic within said opening, and a water and air impervious covering over said metal cap, the covering being united to said one glass sheet beyond the extremities of the metal cap and contoured so as to provide a smoothly contoured outer surface in combination with the outer surface of said glass sheet.

7. In a pore hole seal for a window closure assembly comprising at least two spaced sheets of glass enclosing a dry air chamber, an opening extending from one surface to the other surface of one of said glass sheets, said opening being larger at one end to facilitate the application of a sealing compound within said opening, a polybutene mastic material impervious to water and air substantially completely filling the opening, a malleable metal cap superimposed on the mastic material to maintain the mastic material within the opening, and a water and air impervious synthetic resin covering over the metal cap, the covering being united to said one glass sheet beyond the extremities of the metal cap and contoured so as to provide a smoothly contoured outer surface in combination with the outer surface of said glass sheet.

References Cited in the file of this patent

UNITED STATES PATENTS

| | | |
|---|---|---|
| 2,621,397 | Black | Dec. 16, 1952 |
| 2,683,906 | Nevins | July 20, 1954 |
| 2,686,342 | D'Eustachio | Aug. 17, 1954 |